United States Patent

[15] 3,687,345
[45] Aug. 29, 1972

Carlson et al.

[54] METHOD AND APPARATUS FOR ALIGNING AND BREAKING WAFERS

[72] Inventors: Heinz F. Carlson, Santa Cruz; George L. Issac; Graham H. Mosely, both of Sunnyvale, all of Calif.

[73] Assignee: Signetics Corporation, Sunnyvale, Calif.

[22] Filed: Nov. 23, 1970

[21] Appl. No.: 91,713

[52] U.S. Cl. ....................225/1, 29/413, 225/2, 225/93, 225/96.5, 225/97

[51] Int. Cl. ....................B26f 3/00

[58] Field of Search....................225/1, 2, 93, 96.5, 97; 156/300, 250; 29/413

[56] References Cited

UNITED STATES PATENTS

| | | | |
|---|---|---|---|
| 3,494,523 | 2/1970 | Kalvelage | ....................225/96.5 X |
| 3,517,869 | 6/1970 | Dryon | ....................225/96.5 X |
| 3,562,803 | 2/1971 | Townsend | ....................225/104 |

*Primary Examiner*—Frank T. Yost
*Attorney*—Flehr, Hohbach, Test, Albritton & Herbert

[57] ABSTRACT

A method and apparatus for aligning and breaking scribed semiconductor wafers in which a scribed wafer is accurately aligned and mounted on a frame assembly having locating holes. The frame assembly with the wafer attached thereto is then placed on a breaking platform of a wafer breaker having generally perpendicular first and second breaking ridges and having locating pins which cooperate with the frame assembly locating holes for positioning the frame assembly in alignment with the breaking ridges. Pressure is applied to the frame assembly and wafer for holding them against the breaking platforms. The breaking platform is then translated to cause the wafer to pass over the first and second breaking ridges for breaking the wafer into a plurality of semiconductor chips generally along perpendicular scribe lines on the wafer.

9 Claims, 14 Drawing Figures

Patented Aug. 29, 1972 3,687,345

7 Sheets-Sheet 1

INVENTORS
HEINZ F. CARLSON
GEORGE L. ISAAC
GRAHAM H. MOSELY
BY
Flehr, Hohbach, Test, Albritton & Herbert
ATTORNEYS

INVENTORS
HEINZ F. CARLSON
GEORGE L. ISAAC
GRAHAM H. MOSELY

BY Fidler, Hohbach, Test, Albritton & Herbert
ATTORNEYS

INVENTORS
HEINZ F. CARLSON
GEORGE L. ISAAC
GRAHAM H. MOSELY
BY
Flehr, Hohbach, Test,
Albritton & Herbert
ATTORNEYS INVENTORS
HEINZ F. CARLSON
GEORGE L. ISAAC
GRAHAM H. MOSELY
BY Flehr, Hohbach, Test, Albritton & Herbert
ATTORNEYS INVENTORS
HEINZ F. CARLSON
GEORGE L. ISAAC
GRAHAM H. MOSELY
By Flehr, Hohbach, Test, Albritton & Herbert
ATTORNEYS Patented Aug. 29, 1972

3,687,345

7 Sheets-Sheet 6

INVENTORS
HEINZ F. CARLSON
GEORGE L. ISAAC
GRAHAM H. MOSELY
BY
ATTORNEYS

INVENTORS
HEINZ F. CARLSON
GEORGE L. ISAAC
GRAHAM H. MOSELY
BY Fisher, Hohbach, Test, Albritton & Herbert
ATTORNEYS

METHOD AND APPARATUS FOR ALIGNING AND BREAKING WAFERS

BACKGROUND OF THE INVENTION

This invention pertains to an apparatus and method for aligning and breaking semiconductor wafers of the type having scribe lines generally defining a plurality of semiconductor chips.

In the manufacture of semiconductor devices and in particular integrated circuits, a plurality of integrated circuits which may contain both active and passive devices are simultaneously prepared in a semiconductor wafer. Thus, for example, a 2-inch diameter wafer may contain 100 – 200 or more separate integrated circuits which have been formed according to conventional techniques in the art as, for example, by diffusing predetermined patterns of impurities in a silicon body. Separate devices in a particular single integrated circuit may be isolated from each other by dielectric or PN junction isolation, techniques which are well known in the art.

Each single integrated circuit is of relatively minute dimensions so that it is convenient to simultaneously form a plurality (say upwards of 100) in a single wafer in a diffusion furnace. After the integrated circuits have been formed in the wafer in a manner such as discussed above, the wafers are scribed along perpendicular axes to separate the integrated circuits and define the separate integrated circuits or semiconductor chips on the wafer. After scribing, it is necessary to break the scribed wafer along the two perpendicular axes of the scribe lines in order to separate the individual circuits.

Wafer breaking has been done manually in the past. An operator manually passes the scribed wafer over a breaking surface or applies a roller to the back of the wafer to exert pressure on the wafer and break it into individual semiconductor chips. Such manual operations are expensive and potentially wasteful in that semiconductor wafers are of a delicate nature and may be harmed by inaccurate and imprecise manual operations. There is, therefore, a need for a new and improved automated method and apparatus for breaking scribed semiconductor wafers.

SUMMARY OF THE INVENTION

Accordingly, it is an object of this invention to provide an improved method and apparatus for aligning and breaking semiconductor wafers.

It is another object of this invention to provide a method and apparatus for breaking scribed semiconductor wafers in which the wafers are broken into a plurality of semiconductor chips and the semiconductor chips are retained in an aligned relationship.

Briefly, in accordance with one embodiment of the invention, there is provided apparatus for aligning a scribed semiconductor wafer on a frame assembly with the scribed lines on the semiconductor wafer aligned with respect to locating means in the frame assembly. The frame assembly with the semiconductor wafer attached thereto is then yieldably held by holding means against a breaking platform with the scribe lines of the semiconductor wafer aligned with respect to first and second breaking ridges of the breaking platform. The holding means holds the wafer against the breaking platform while the breaking platform is moved relative to the wafer so as to cause the wafer to pass over first and second generally perpendicular breaking ridges of the breaking platform for breaking the scribed semiconductor wafer into a plurality of distinct semiconductor chips.

FIG. *9a* and *9b* are cross sectional views of the diaphragm assembly taken along the line 9—9.

FIG. *10a* and *10b* are time sequence views of the wafer breaker platform showing how a wafer is broken by a breaking edge on the breaking platform.

Figures 10A, 10B, 11:
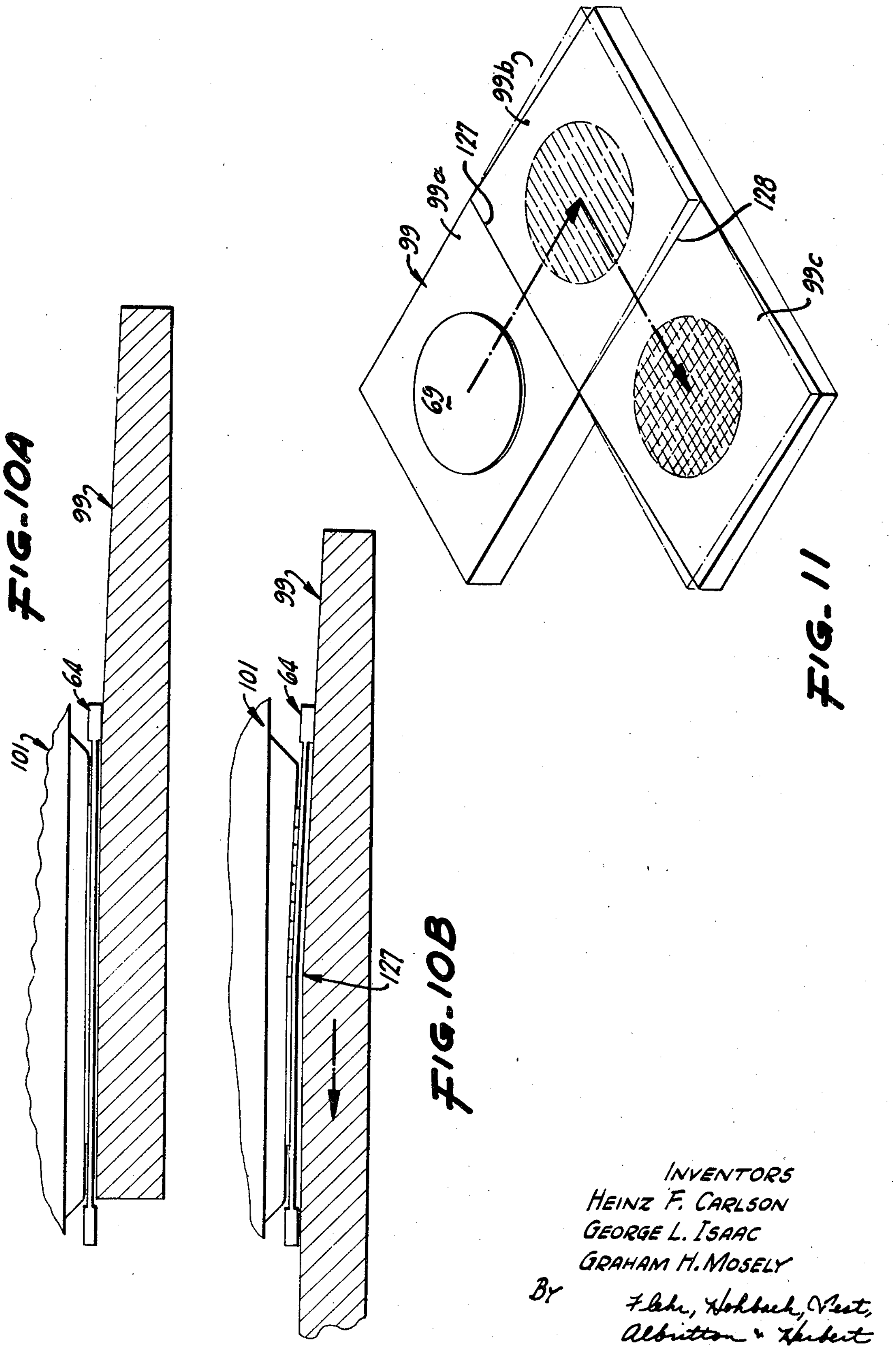

FIG. 11 is an isometric view of the breaking platform of the wafer breaker apparatus.

DESCRIPTION OF THE PREFERRED EMBODIMENTS

Referring now to FIGS. 1 through 5 there is shown an apparatus for aligning a semiconductor wafer. The alignment apparatus 11 includes a base 12 to which is mounted a positioning unit 13. Vertical adjustment units 14 and 16 which may for example be rack and pinion units are also mounted on the base 12. Vertical adjustment unit 14 adjusts the vertical position of a platen 17 and vertical adjustment unit 16 adjusts the vertical position of an arm 18. The arm 18 has a horizontal portion *18a* to which is mounted optical means in the form of a microscope assembly 19. The platen 17 is generally aligned with the vertical optical axis of microscope assembly 19. The horizontal arm portion *18a* also mounts an illuminating light 21 and a vacuum switch 22 for controlling application of a vacuum from a vacuum inlet 23 to a vacuum line 24.

The positioning unit 13 includes a bottom member 26, an intermediate member 27 having notched edges *27a* and a top member 28 having notched edges *28a*. The bottom member 26 mounts notched end members 29 and an upstanding member 31 which an adjustment screw 32 threadedly engages. Ball bearings 33 are mounted between the notched end members 29 and the notched edges *27a* of intermediate member 27. The intermediate member 27 mounts notched end members 34 and an upstanding member 36 in which an adjustment screw 37 is threadedly engaged. Ball bearings 38 are disposed between the notched end members 34 and the notched edges *28a* of the top member 28. A column 39 having an adjustment lever 39*a* is rotatably mounted upon the top member 28 by a spherical bearing 41 which is embedded therein. A plate member 42 is secured to the column 39 by screws 43. Vacuum probe supports 44 and 46 are mounted at either end of the plate member 42 and mount a vacuum probe 47 and a vacuum probe 48, respectively. A vacuum probe clamp 49 and a vacuum probe clamp 51 are mounted as shown to the vacuum probe supports 44 and 46 and have threadedly engaged set screws 52 and 53 for bearing against the vacuum probes 47 and 48 to firmly retain them between the vacuum probe supports 44 and 46 and the vacuum probe slamps 49 and 51.

The vacuum probe 47 has a vacuum inlet 54 which is connected through a passageway 55 to a probe surface 56. Similarly, the vacuum probe 48 has a vacuum inlet 57 which is connected through a passageway 58 to a probe surface 59. The probe surfaces 56 and 59 are spaced to either side of the optical axis of microscope assembly 19 and are adapted to hold a semiconductor wafer generally along the optical axis.

The platen 17 has a depressed area 61 and locating pins 62 and 63. The locating pins 62 and 63 are adapted to position a frame assembly 64 on the platen 17 by cooperating with locating holes 64*a* in the frame assembly 64. The frame assembly 64 comprises metal frames 66 and 67 separated by a plastic sheet 68. The metal frames 66 and 67 have their interior sides coated with adhesive for adhering to the plastic sheet 68 to form a unitary frame assembly 64. The plastic sheet 68 also has an adhesively coated portion 68*a* on one side thereof.

In practicing the alignment method of this invention, the vertical adjustment unit 14 is cranked to a lower position so that the platen 17 is spaced from the vacuum probes 47 and 48. A wafer 69, which may be a semiconductor wafer formed of silicon or the like in which a plurality of integrated circuits have been formed by diffusion techniques well known in the art and which have a plurality of mutually perpendicular scribe lines 69*a* (which may, for example, be 0.0001 inches deep) defining the separate integrated circuits, is placed in the depressed area 61 of the platen 17. The vertical adjustment unit 14 is then adjusted so that the platen 17 is elevated towards the vacuum probes 47 and 48 until the probe surfaces 56 and 59 are in contact with the wafer 69. Then the vacuum switch 22 is actuated to apply a vacuum through the vacuum line 24 and the vacuum inlets 54 and 57 through the passageways 55 and 58 to the vacuum probe surfaces 56 and 59 so that the wafer 69 is held by the vacuum probe surfaces 56 and 59. The vertical adjustment unit 14 is then adjusted so that the platen 17 is moved downward from the vacuum probes 47 and 48, leaving the wafer 69 held by the vacuum probe surfaces 56 and 59. Next, the frame assembly 64 is positioned on the platen 17 with the locating holes 64*a* in registry with the locating pins 62 and 63.

Figure 1:
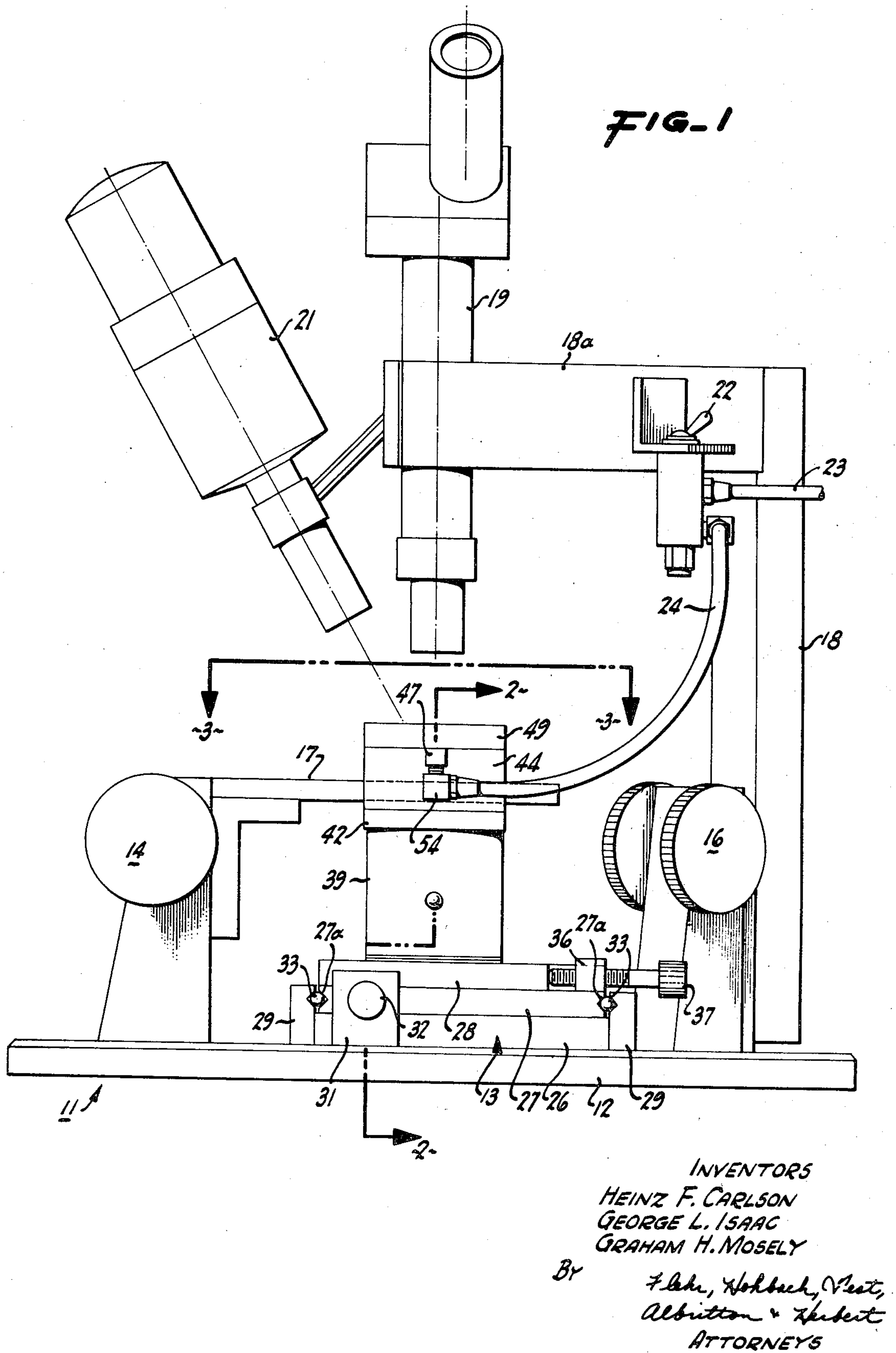
FIG. 1 is a side elevation of an apparatus for aligning a semiconductor wafer on a frame assembly.
Figure 2:
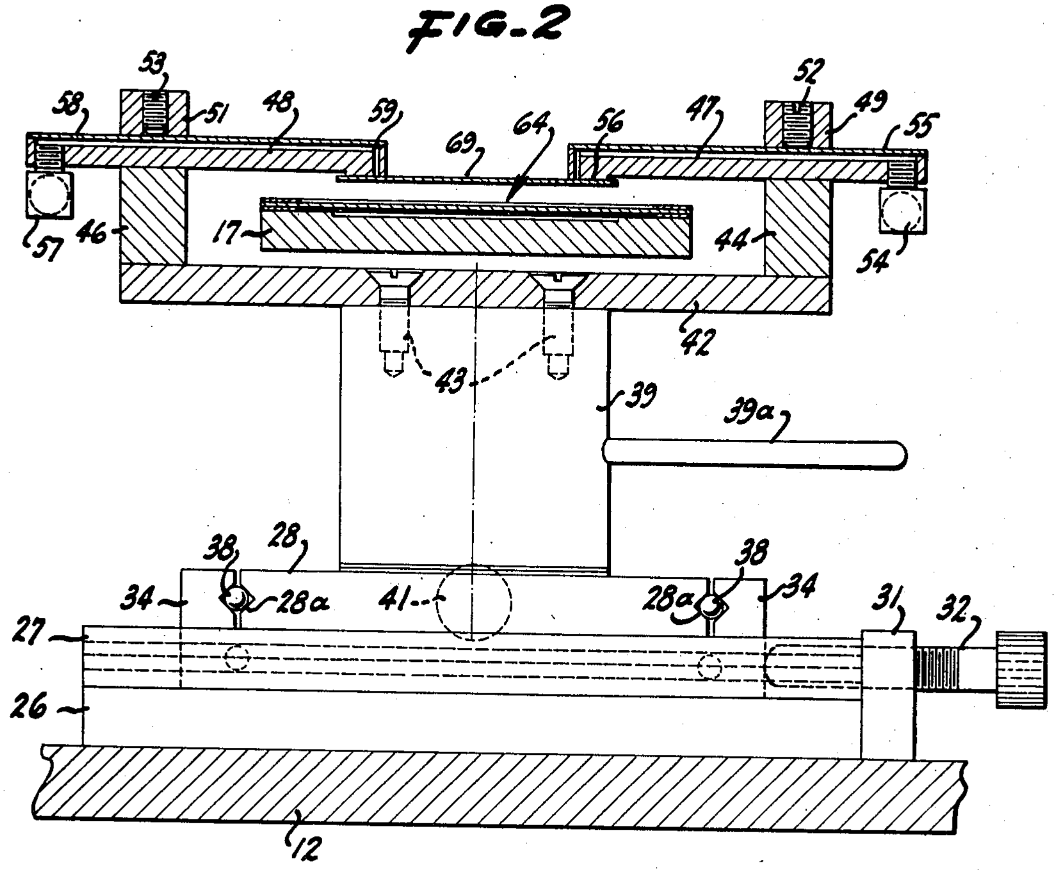
FIG. 2 is a section of the alignment apparatus of FIG. 1 taken along the line 2—2 in FIG. 1.
Figure 5:
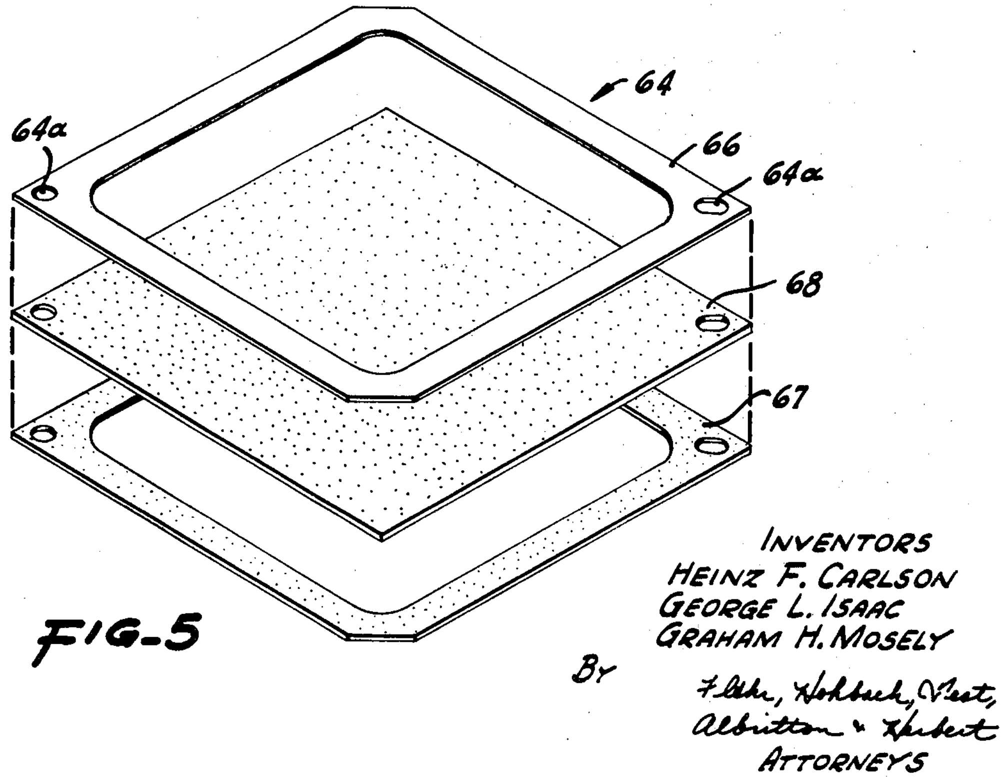
FIG. 5 is an exploded view of a frame assembly for mounting a semiconductor wafer.
Figure 3A:
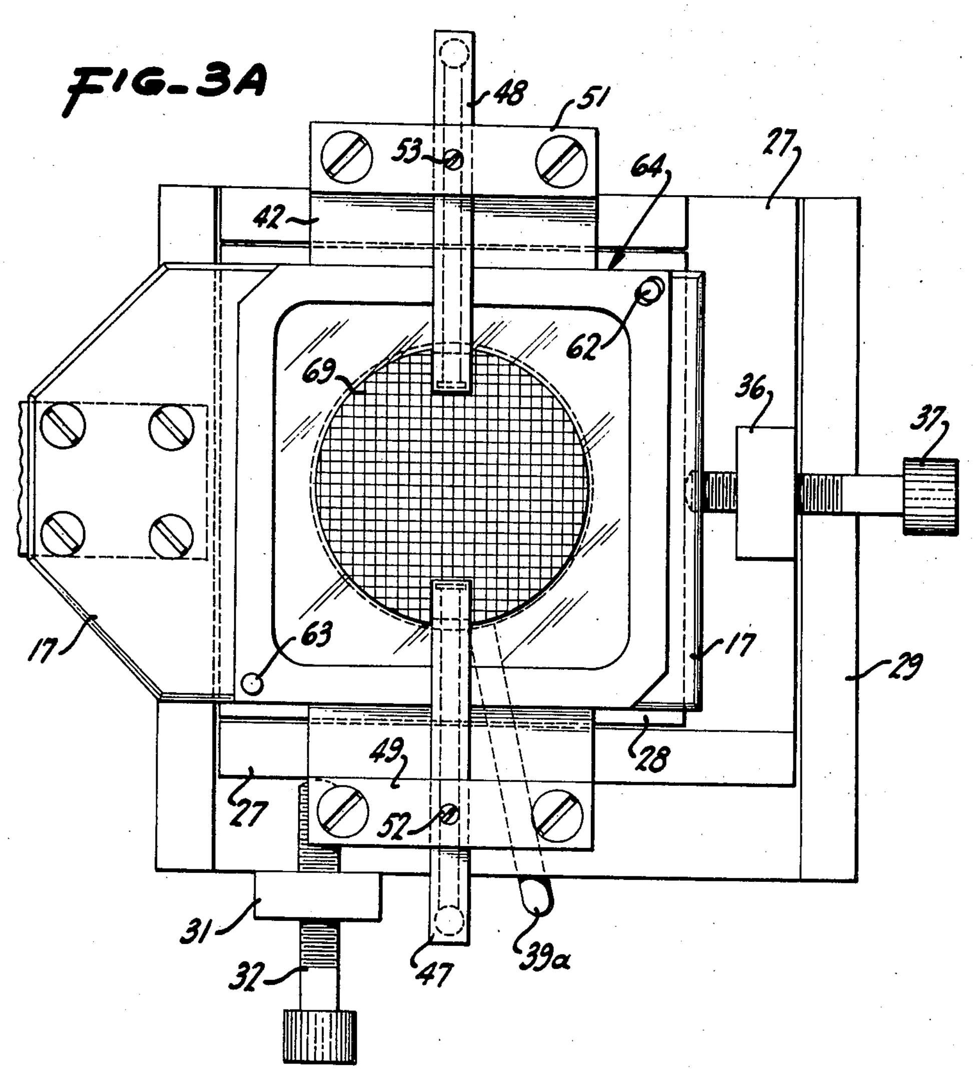
FIG. 3a is a top plan view of a portion of the alignment apparatus of FIG. 1 taken along the line 3—3.
Figure 3B:
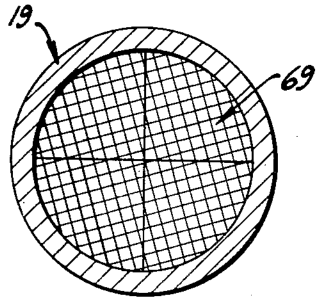
FIG. 3b is an illustration of what an operator sees when looking through the microscope assembly.
Figure 4:
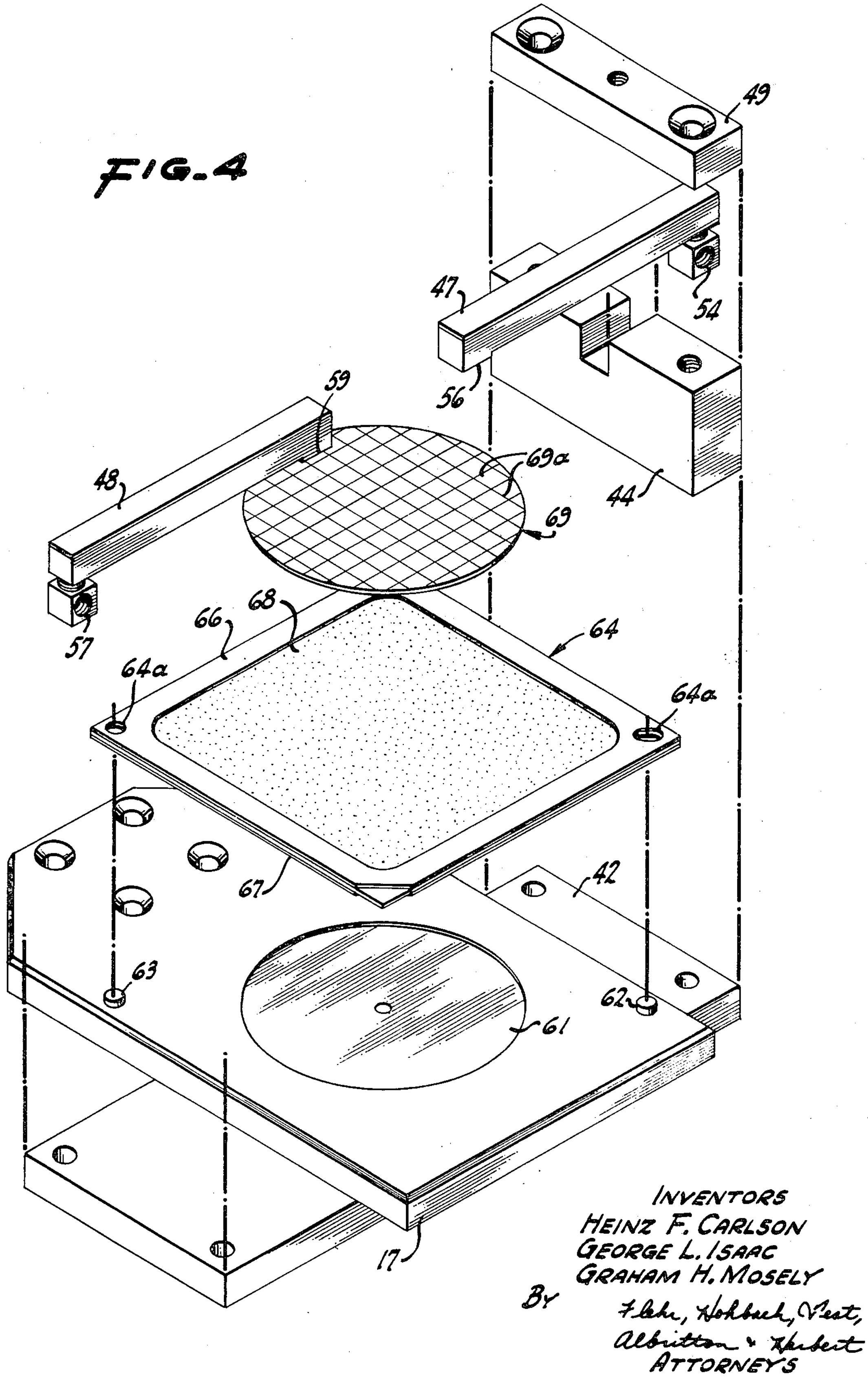
FIG. 4 is an exploded view of a portion of the alignment apparatus of FIG. 1.

Referring now to FIG. 3*b* an operator looking through the microscope assembly 19 sees the wafer 69 which is being retained by the vacuum probes 47 and 48 and the operator also sees a visual registration pattern in the form of crosshairs 20 which is present on the optics in the microscope assembly 19. The operator then proceeds to align the perpendicular scribe lines on the wafer 69 with the crosshairs in the microscope assembly 19. It should be noted at this point that the crosshairs 20 in the microscope assembly 19 have previously been aligned with respect to the locating pins 62 and 63 on the platen 17. The operator then proceeds to adjust the position of the wafer 69 with respect to the microscope assembly 19 and hence the frame assembly 64 by adjusting the position of the plate member 42 to which the vacuum probes 47 and 48 are mounted by the vacuum probe supports 44 and 46. The adjustment screw 32 bears against an edge of the intermediate member 27 which is mounted for slideable movement with respect to the bottom member 26 by means of the ball bearings 33 which cooperate with notched edges 27*a* of intermediate member 27 and notches in notched end members 29. The adjustment screw 32 bears against the intermediate member 27 and adjustment of the adjustment screw 32 translates the intermediate member 27 (and the top member 28 which is mounted thereto) in a first direction. The top member 28 is also mounted for slideable movement with respect to the intermediate member 27 through ball bearings 38 which cooperate between notched edges 28a of the top member 28 and notched end members 34 carried by the intermediate member 27. An adjustment screw 37 is provided which bears against an edge of the top member 28 to translate it in a second direction which is generally perpendicular to the first direction. The column 39 is mounted for rotational movement with respect to the top member 28 by means of a spherical bearing 41 retained in the top member 28. Movement of the adjustment lever 39*a* rotates the column 39. Rotation of column 39 rotates the plate member 42, vacuum probe supports 44 and 46, the vacuum probes 47 and 48 and hence the wafer 69 retained thereby. By means of these three adjustments, the adjustment screw 32, the adjustment screw 37 and the adjustment lever 39*a*, the semiconductor wafer 69 is translated and rotated until the scribe lines 69a on the semiconductor wafer 69 are in alignment with the crosshairs in the microscopic assembly 19. Rotation alone will align the wafer scribe lines but the translational adjustment screws 32 and 37 may be used to centralize the wafer 69 with respect to the frame assembly 64. Then the vertical adjustment unit 14 is adjusted so that the platen 17 with the frame assembly 64 retained thereon and the adhesively coated portion 68*a* of the plastic sheets 68 towards the top is elevated until the adhesively coated portion 68a bears against the underside of the wafer 69. Then the vacuum switch 22 is shut off so that the vacuum is removed from the vacuum probe surfaces 56 and 59 and the vertical adjustment unit 14 is adjusted so that the platen 17 moves downward, carrying with it the frame assembly 64 with the wafer 69 retained thereon and the scribe lines 69*a* aligned with respect to the locating holes 64*a* in the frame assembly 64.

Figures 6, 9A, 9B:
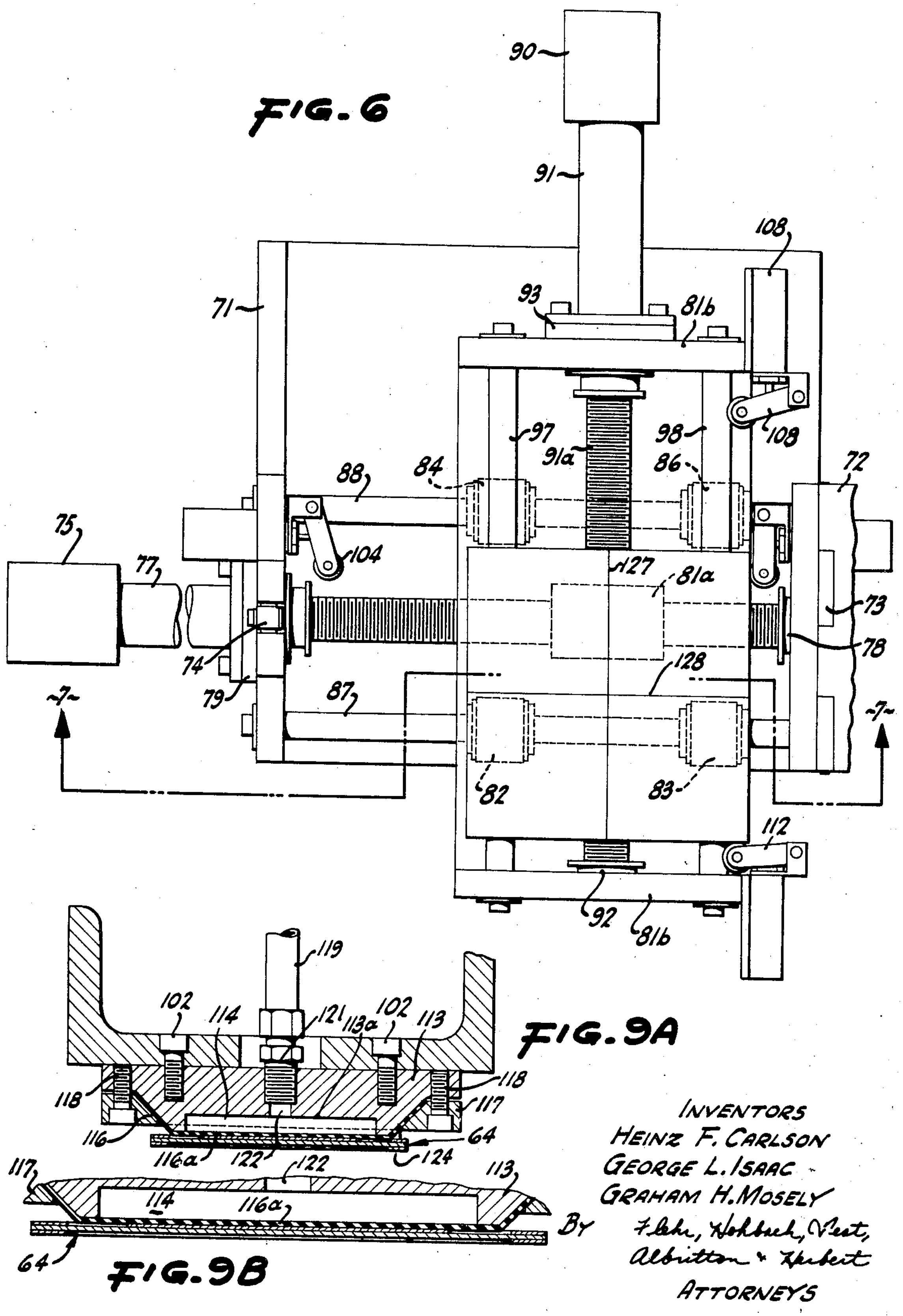
FIG. 6 is a top plan view of a wafer breaking apparatus.
Figure 7:
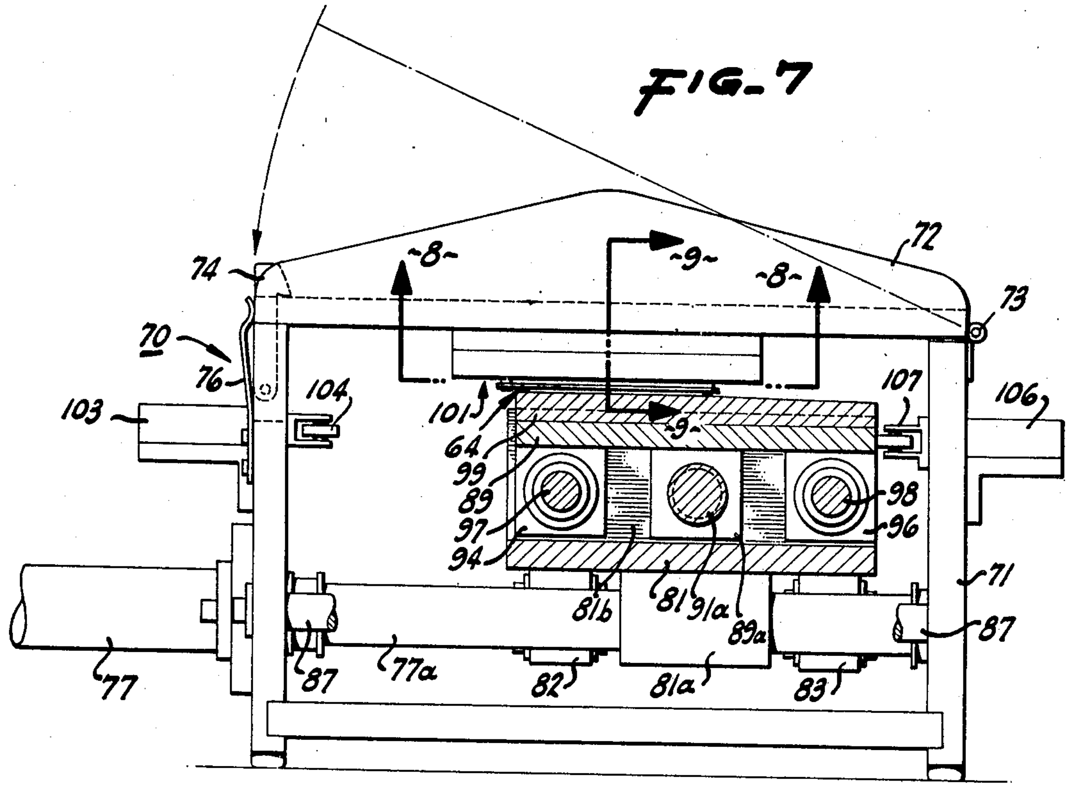
FIG. 7 is an elevation partly in cross section of the wafer breaking apparatus taken along the line 7—7.
Figure 8:
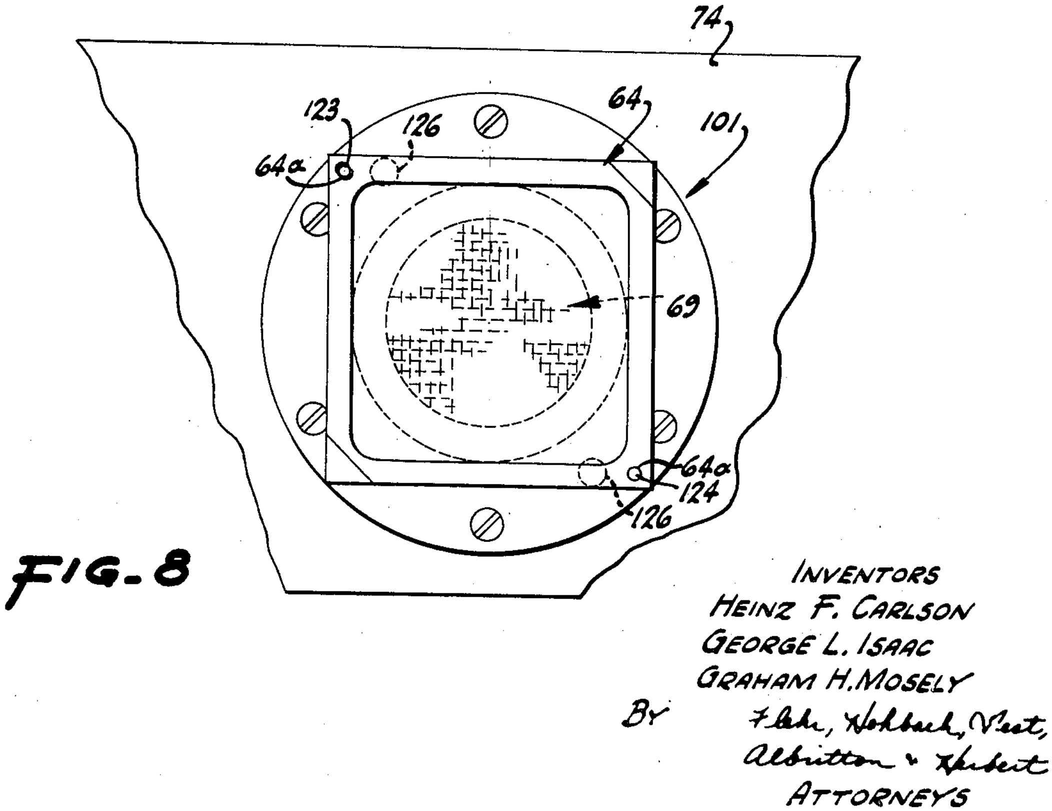
FIG. 8 is a plan view of a diaphragm assembly portion of the wafer breaker apparatus of FIG. 7 taken along the line 8—8.

Referring now to FIGS. 6 through 11, there is shown a wafer breaker apparatus 70 for breaking the scribed wafer aligned by the apparatus shown in FIGS. 1 through 5. The wafer breaker apparatus 70 comprises a frame 71 to which a lid 72 is hingedly attached by a hinge 73. The lid 72 is adapted to be held in a closed position by a detent latch 74 urged into engagement with the lid 72 by a spring 76. A shaft 77 having a threaded portion 77*a* is mounted in the frame 71 by an end bushing assembly 78 and by an intermediate bushing assembly 79. The shaft 77 is adapted to be rotated by motor means 75 which may, for example, be an electric or pneumatic motor. A lower platform support 81 has an extended member 81*a* which threadedly engages the threaded portion 77*a* of shaft 77. The lower platform support 81 also has mounted thereto and downwardly depending therefrom bushing assemblies 82, 83, 84 and 86. Bushing assemblies 82 and 83 surround a guide shaft 87 mounted in the frame 71 and are adapted for slidable movement with respect to guide shaft 87. Similarly, the bushing assemblies 84 and 86 surround a guide shaft 88 also mounted in the frame 71 and are adapted for slidable movement with respect to the guide shaft 88. The lower platform support 81 also has upstanding end members 81*b* disposed at opposite ends thereof. An upper platform support 89 has an extended member 89*a* which threadedly engages a threaded portion 91*a* of a shaft 91. The shaft 91 is carried by the upstanding end members 81*b* of the lower platform support 81 and is mounted therein by an end bushing assembly 92 and an intermediate bushing assembly 93. The upper platform support 89 also has four bushing assemblies mounted thereto and downwardly depending therefrom. Only two of these bushing assemblies indicated by reference numerals 94 and 96 are shown in FIG. 7. The bushing assembly 94 surrounds a guide shaft 97 which is mounted in the upstanding end members 81*b* of the lower platform 81 and is adapted for slidable movement with respect to the guide shaft 97. Similarly, the bushing assembly 96 surrounds a guide shaft 98 also mounted in the upstanding end members 81*b* of the lower platform support 81 and is adapted for slidable movement with respect to the guide shaft 98. The shaft 91 is adapted to be rotated by suitable motor means 90 which may, for example, be an electric or pneumatic motor.

A breaking platform 99 is integrally mounted to the upper platform support 89 and a diaphragm assembly 101 which is mounted to the lid 72 by suitable means such as screws 102 is adapted to bear against the breaker platform 99 when the lid 72 is in the closed position as illustrated in FIG. 7. The breaking platform 99 has a first surface 99*a* and a second surface 99*b* which intersects the first surface 99*a* at an angle to define a first breaking ridge 127 therebetween. The angle at which the second surface 99*b* intersects the first surface 99*a* need not be great; it has been found that an angle of 3 to 4 degrees is sufficient. A third surface 99*c* also intersects the second surface 99*b* at an angle to define a second breaking ridge 128 generally perpendicular to the first breaking ridge 127. Again, the angle at which the third surface 99*c* intersects the second surface 99*b* need not be great; it has been found that an angle of 3 to 4 degrees is sufficient. In accordance with one embodiment of the invention the first, second and third surfaces of breaking platform 99 are planar surfaces. A limit switch bracket 103 mounts a limit switch 104 which is adapted to be actuated by the upper platform support 89 and a limit switch bracket 106 mounts a limit switch 107 which is also adapted to be contacted by the upper platform support 89. In a similar manner, a limit switch bracket 108 mounts a limit switch 109 which is adapted to be contacted by the lower platform support 81 and a limit switch bracket 111 mounts a limit switch 112 which is also adapted to be contacted by the lower platform support 81.

The diaphragm assembly 101 is mounted to the lid 72 by the screws 102 and includes a pressure chamber member 113 having a recessed portion 113*a* defining a pressure chamber generally indicated by reference number 114. A diaphragm 116, which may, for example, be a rubber diaphragm, is seated against the pressure chamber member 113 and has a holding surface 116*a* covering the pressure chamber 114. A clamping ring 117 which is secured to the pressure chamber member 113 by suitable means such as screws 118 clamps the diaphragm 116 against the pressure chamber member 113. An air inlet hose 119 terminates in a fitting 121 which extends through the lid 72 and threadedly engages the pressure chamber member 113. The threaded end of fitting 121 opens into a passageway 122 which communicates with the pressure chamber 114. The air inlet hose 119 is adapted to be connected to a source of air (not shown). The diaphragm assembly 101 through the holding surface 116*a* of the diaphragm 116 exerts a pressure on the wafer 69 and frame assembly 64 to firmly hold them against the breaking platform. The pressure applied to the diaphragm 116 may be varied by adjusting the pressure source which feeds the air inlet hose 119. It is desirable to have an adjustable pressure exerted by the holding surface 116*a* in order to accomodate different thicknesses of wafers, different depths of scribe lines, and to accomodate both the conditions where a plastic sheet 68 is used in a frame assembly 64 with a wafer 69 attached thereto and also the case in which a wafer is broken without the use of any frame assembly.

The clamping ring 117 carries two locating pins 123 and 124 which are adapted to cooperate with locating holes 64*a* of the frame assembly 64 for positioning the frame assembly 64 onto the diaphragm assembly 101. Magnets 123 are embedded in the pressure chamber member 113 interiorly of the diaphragm 116 for magnetically attracting and holding the frame assembly 64.

The method of this invention for breaking wafers may be practiced with the wafer breaking apparatus as follows. Initially, the lid 72 is in the open position (such as shown in FIG. 6). A frame assembly 64 with a wafer 69 attached thereto and aligned therewith as previously discussed in connection with the wafer alignment apparatus and method is positioned on the locating pins 123 and 124 with the wafer 69 disposed adjacent the holding surface 116*a* of the diaphragm 116. The magnets 126 retain the frame assembly 64 on the diaphragm assembly 101. The lid 72 is then closed to a position such as that indicated in FIG. 7. When the lid 72 is closed, the diaphragm assembly 101 with the frame assembly 64 and semiconductor wafer 69 is disposed against the first surface 99*a* of the breaking platform 99. Air is then supplied through the air inlet hose 119 into the pressure chamber 114 and a pressure develops within the chamber 114 which tends to expand the diaphragm 116 so that its holding surface 116*a* exerts pressure on the wafer 69 and frame assembly 64 to hold them firmly against the first surface 99*a* of the breaking platform 99. The motor means 75 for driving shaft 77 is then activated so that shaft 77 and its threaded portion 77*a* rotates. As the threaded portion 77a rotates the extended member 81*a* of the lower platform support 81 which is threadedly engaged on the threaded portion 77*a* is translated along the axis of the shaft 77. The bushings assemblies 82 and 83 slidably guide the lower platform support 81 along the guide shaft 87 and the bushing assemblies 84 and 86 serve as similar guides for the lower platform support along the guide shaft 88. During this time the frame assembly 64 and wafer 69 are being firmly held by the diaphragm assembly 101 so that as the breaking platform 99 translates the frame assembly 64 and wafer 69 (which are held stationary) pass over a first breaking ridge 127 and onto the second surface 99*b* of the breaking platform 99. Rotation of shaft 7 continues until the lower platform support 81 contacts and actuates the limit switch 104. When limit switch 104 is actuated the motor means 75 for driving shaft 77 is de-actuated. Actuation of the limit switch 104, besides de-activating the motor means 75 for shaft 77, activates the motor means 90 for the shaft 91. As the shaft 91 rotates, its threaded portion 91*a* rotates within the extended member 89*a* of the upper platform support causing the upper platform support to be translated along the guide shafts 97 and 98 along the axis of the shaft 91. Thus, the upper platform support 89 and the breaking platform 99 are translated with respect to the frame assembly 64 and wafer 69 so that the wafer 69 and frame assembly 64 (which are held stationary) pass over a second breaking ridge 128 onto the third surface 99*c* of the breaking platform 99. This movement continues until the upper platform support 89 encounters and actuates the limit switch 109. When limit switch 109 is actuated the motor means 90 for driving shaft 91 is de-actuated and the diaphragm is depressurized. The lid 72 may then be opened and the frame assembly 64 with the wafer 69 adhesively secured thereto removed from the diaphragm assembly 101. Then, both motor means 75 and 90 for shaft 77 and shaft 91, respectively, may be simultaneously actuated to rotate in a direction reverse to their previous rotation so that the breaking platform is returned to its original position. When the breaking platform does return to its original position, the limit switches 107 and 112 are encountered and actuated and they respectively deactuate the motors 75 and 90 for driving shafts 77 and 91.

Referring now to FIGS. 10*a*, 10*b* and 11, there is diagramatically illustrated the movement of a breaking platform 99 with respect to the wafer 69 and frame assembly 64 illustrating the manner in which the scribed wafer 69 is broken. FIG. 10*a* shows the position of the frame assembly 64 and wafer 69 situated on the first surface 99*a* of the breaking platform 99. The generally perpendicular scribe lines on the wafer 69 are aligned so that they are respectively parallel to the generally perpendicular first and second breaking ridges 127 and 128. The breaking platform 99 is then translated in a direction shown by the arrow in FIG. 10*b* which is generally parallel to the second breaking ridge 128 so that the wafer 69 (which is held stationary) effectively passes from the first surface 99*a* of the breaking platform 99 over the first breaking ridge 127 and onto the second surface 99*b* of breaking platform 99. As the wafer 69 passes over the first breaking ridge 127 the wafer is broken along the scribe lines parallel to the first breaking ridge 127. Next, the breaking platform 99 is translated in a direction generally parallel to the first breaking ridge 127 so that the wafer 69 relatively moves from the second surface 99*b* of breaking platform 99 over the second breaking ridge 128 and onto the third surface 99*c* of the breaking platform 99. This relative movement between the wafer 69 and breaking platform 99 breaks the wafer 69 along the scribe lines which are parallel to the second breaking ridge 128. Thus, in this manner the wafer 69 is broken along the generally perpendicular scribe lines to form a plurality of semiconductor chips. The individual semiconductor chips may be retained in an assembly by a backing layer on the wafer 69 or, if no backing layer is provided on the wafer 69, they will be retained on the adhesively coated surface 68*a* of the plastic sheet 68 of the frame assembly 64.

Semiconductor wafers may be broken after they have been aligned on frame assemblies as discussed above. Alternatively, semiconductor wafers may be placed on the breaking platform 99 without the use of any frame assemblies and the scribe lines on the wafer visually aligned so that they are respectively parallel to the first and second breaking ridges. Use of a frame assembly 64 with an adhesively coated plastic sheet 68 does have other advantages, however. After a wafer carried by a frame assembly 64 has been broken, the individual semiconductor chips formed thereby are retained on the adhesively coated plastic sheet 68 and are accurately aligned in position with respect to locating holes of the frame assembly. Thus, after the wafer has been broken into semiconductor chips the frame assembly with the semiconductor chips retained thereon may be utilized in further operations, such as, for example, electrical testing of the individual semiconductor chips. The frame assembly ensures alignment of the individual semiconductor chips so that automated testing and contacting of the individual semiconductor chips may be made.

Thus, what has been described is an improved method and apparatus for aligning and breaking wafers. Wafers are aligned on a frame assembly so that scribe lines on the wafer are accurately positioned with respect to locating means on the frame assembly. The frame assembly is then placed in a wafer breaker apparatus having a breaking platform with first and second generally perpendicular breaking ridges. The breaking platform is translated in a direction generally parallel to the second breaking ridge so that the first breaking ridge passes over the wafer so that the scribe lines parallel to the first breaking ridge are broken. The breaking platform is then translated parallel to the first breaking ridge and the scribe lines parallel to the second breaking ridge are broken as the second breaking ridge passes over the wafer. If desired, a wafer may be positioned on the breaking platform without the use of any frame assembly and manually visually aligned with its generally perpendicular scribe lines respectively parallel to the first and second breaking ridges.

We claim:

1. Apparatus for breaking a semiconductor wafer of the type having a plurality of first and second scribe lines which are perpendicular to each other and which define a plurality of semiconductor chips comprising a breaking platform having first, second and third surfaces, said second surface intersecting said first surface intersecting said first surface at an angle to define a first breaking ridge, said second surface intersecting said third surface at an angle to define a second breaking ridge, said second breaking ridge being generally perpendicular to said first breaking ridge, holding means for yieldably holding a semiconductor wafer against said breaking platform with the first and second scribe lines of the wafer respectively aligned generally parallel to said first and second breaking ridges, first means for causing relative translational movement parallel to said second breaking ridge between the wafer and the breaking platform to relatively move the wafer from said first surface over said first breaking ridge and onto said second surface and second means for causing relative translational movement between the wafer and said breaking platform parallel to said first breaking ridge to relatively move the wafer over said second breaking ridge and on to said third surface whereby the wafer is broken along the first and second scribe lines.

2. Apparatus in accordance with claim 1 wherein said holding means comprises a diaphragm having a holding surface, a pressure source, and means for connecting said diaphragm to said pressure source whereby a pressure is developed within said diaphragm and said holding surface exerts pressure on the wafer to hold it firmly against said breaking platform.

3. Apparatus in accordance with claim 1 wherein one of said first and second means for causing translational movement comprises a base having first guides, a first platform support slidably mounted on said first guides, a first shaft threadedly engaging said first frame, first motor means for rotating said first shaft whereby said first frame is translated along said first guides, and wherein the other of said first and second means for causing translational movement comprises second guides carried by said first frame generally at right angles to said first guides, a second platform support slidably mounted on said second guides, said breaking platform mounted on said second platform support, a second shaft threadedly engaging said second platform support and second motor means for rotating said second shaft whereby said second frame is translated along said second guides.

4. Apparatus in accordance with claim 2 wherein said pressure source is adjustable so that the pressure exerted by said holding surface on the wafer is adjustable.

5. Apparatus for aligning and breaking a semiconductor wafer of the type having a plurality of first and second scribe lines which are perpendicular to each other and which define a plurality of semiconductor chips comprising a frame assembly having locating means and an adhesive surface holding a semiconductor wafer on said frame assembly and maintaining the first and second scribe lines in a predetermined alignment with respect to said locating means, a breaking platform having first, second and third surfaces, said second surface intersecting said first surface at an angle to define a first breaking ridge, said second surface intersecting said third surface at an angle to define a second breaking ridge, said second breaking ridge being generally perpendicular to said first breaking ridge, holding means for yieldably holding said frame assembly and wafer against said breaking platform, said holding means having positioning means which cooperate with said locating means of said frame assembly so that the wafer is oriented with the first and second scribe lines of the wafer aligned parallel to said first and second breaking ridges, respectively, first means for causing relative translational movement parallel to said second breaking ridge between the wafer and the breaking platform to move the wafer from said first surface over said first breaking ridge and onto said second surface and second means for causing relative translational movement between the wafer and the breaking platform parallel to said first breaking ridge whereby said wafer passes over said second breaking ridge and onto said third surface whereby the wafer is broken along the first and second scribe lines.

6. Apparatus in accordance with claim 5 wherein said holding means includes a diaphragm having a holding surface, a pressure source and means for connecting said diaphragm to said pressure source whereby a pressure is developed within said diaphragm and said holding surface exerts pressure on the wafer holder and wafer to hold them against said breaking platform.

7. Apparatus in accordance with claim 5 wherein one of said first and second means for causing translational movement comprises a base having first guides, a first platform support slidably mounted on said first guides, a first shaft threadedly engaging said first platform support, first motor means for rotating said first shaft whereby said first platform support is translated along said first guides and wherein the other of said first and second means for causing relative translational movement comprises second guides carried by said first platform support generally at right angles to said first guides, a second platform support slidably mounted on said second guides, a second shaft threadedly engaging said second platform support and second motor means for rotating said second shaft whereby said second platform support is translated along said second guides.

8. Apparatus in accordance with claim 6 wherein said pressure source is adjustable for adjusting the pressure exerted by said holding surface on the wafer holder and wafer.

9. A method for breaking a semiconductor wafer of the type having a plurality of first and second scribe lines which are perpendicular to each other and which define a plurality of semiconductor chips comprising aligning the semiconductor wafer with first and second perpendicular breaking ridges of a breaking platform so that the first scribe lines are parallel to the first breaking ridge and the second scribe lines are parallel to the second breaking ridge, yieldably urging the aligned wafer against the breaking platform, relatively translating the breaking platform with respect to the wafer in a direction parallel to the second breaking ridge so that the wafer passes over the first breaking ridge and is broken along the first scribe lines and relatively translating the breaking platform with respect to the wafer in a direction parallel to the first breaking ridge over the second breaking ridge so that the wafer is broken along the second scribe lines.

* * * * *